Aug. 23, 1955      F. J. DOHRER      2,715,944

ROTATING CELL ELECTRIC DUST PRECIPITATOR

Filed July 6, 1951      6 Sheets–Sheet 1

INVENTOR
FRANCIS J. DOHRER
BY Cook and Schermerhorn
ATTORNEYS

Aug. 23, 1955    F. J. DOHRER    2,715,944
ROTATING CELL ELECTRIC DUST PRECIPITATOR
Filed July 6, 1951    6 Sheets-Sheet 3

INVENTOR
FRANCIS J. DOHRER
BY
Cook and Schermerhorn
ATTORNEYS

INVENTOR
FRANCIS J. DOHRER

BY Cook and Schermerhorn
ATTORNEYS

United States Patent Office 2,715,944
Patented Aug. 23, 1955

2,715,944
ROTATING CELL ELECTRIC DUST PRECIPITATOR

Francis J. Dohrer, Seattle, Wash.

Application July 6, 1951, Serial No. 235,488

18 Claims. (Cl. 183—7)

This invention relates to a device for precipitating dust from a moving stream of gas by electrostatic action.

Known electric dust precipitators are generally of three types. A first type, used in smelter stacks, employs high tension wires suspended in vertical pipes mounted in the gas flow. Precipitated dust is removed from time to time by tapping or vibrating the electrodes. A second type has stationary precipitating cells with flat plates which gradually accumulate dust from the gas stream and must be removed from the machine periodically for cleaning. Such a machine must be taken out of service while the cells are being cleaned, and this necessitates either shutting off the gas flow entirely or else by-passing the gas flow temporarily without any cleaning action. Where continuous operation of the precipitator is necessary, two units must be installed so the gases can be diverted into one section while the other section is being cleaned. This dual installation is not only costly to install, but requires considerable labor cost in cleaning. Since it is impractical to perform the cleaning operation oftener than once every one or two weeks, machines with stationary plates are very large and normally require separate buildings to house them. The apparatus cannot be shipped assembled, but must be erected in the field, involving costs in addition to the purchase price of the equipment.

A third type of electric precipitator has a considerable number of precipitating plates mounted for travel through the moving gas stream on a series of endless chains trained over rotating sprocket wheels. In this type of machine it is customary to support the endless chains in a vertical position with an oil bath under the lowermost sprocket wheels. The precipitating plates are caused to travel upwardly through a horizontally flowing gas stream, around a pair of top sprocket wheels, and then downwardly for a second pass through the gas stream, after which the plates pass through the oil bath at the bottom to remove accumulated dust in preparation for a second trip around the circuit.

The latter type of machine has the advantage of operating continuously, and is intended to be continuously self-cleaning, but there are nevertheless a number of disadvantages and shortcomings, both in the precipitating action and in the cell cleaning action. The precipitating plates are caused to traverse the gas stream twice before being cleaned, and there is the likelihood of dust which was precipitated on the first pass through the gas stream being removed and reentering the gas stream on the second pass in spite of the oil film which remains on the plates in such machine. The cleaning action leaves much to be desired because the slow movement of the precipitating plates through the oil bath is not very effective to remove all the accumulated dirt. Periodic cleaning of the plates by some additional means is usually necessary, though not as frequently as with the stationary cell type of machine. Dust left on oil coated dust precipitating electrodes has a tendency to cake and bind itself to the electrodes, the dust deposit increasing in thickness and becoming more difficult to remove with time. Such dust deposits or dirt layers reduce the gas cleaning efficiency of the precipitator, introducing the equivalent of a high resistance in the energizing circuit for the relatively insulated dust precipitated electrodes. Such deposits or layers also obstruct the gas flow and increase the frequency of flash-overs and spitting, to the detriment of the high voltage, direct current, power supply equipment which is employed to energize the precipitating electrodes. Also, the use of an oil cleaning bath is not satisfactory because there still remains the disagreeable problem of disposing of the dirty oil and the re-filling of the bath with clean oil. The dust is not reduced to a form for convenient ultimate disposal.

The general object of the present invention is, therefore, to provide an electric precipitator which is an improvement over existing machines to overcome the disadvantages and shortcomings of the known types of precipitators hereinabove mentioned.

A particular object is to provide an electric precipitator which is adapted for continuous operation and which need not be shut down, in whole or in part, for cleaning purposes.

Another object is to reduce the shut-down time of the electric precipitator when it is necessary to repair or replace defective parts, such as cells or electrical contactors, that may become damaged by short circuit or otherwise.

Another object is to provide an electric precipitator which is entirely automatic in operation and which does not require frequent manual attention for cleaning the plates, changing the oil bath, etc.

Another object is to provide a precipitator capable of handling a greater concentration of dust than conventional precipitators and thus better adapted for industrial uses.

Another object is to provide a precipitator of large dust handling capacity in a size which may be shipped assembled, obviating field erection problems and separate buildings to house the structure.

In the present machine, the precipitating plates are mounted in cell units disposed around the periphery of a large rotor into which the gas to be cleaned is introduced in an axial direction for radial flow outwardly through the precipitating cells. The rotor is turned at a rate appropriate for the dust concentration, whereby the dust laden cells are brought one by one into a cleaning position, where the accumulated dust is removed and the plates oiled once in each revolution of the rotor. A cycle control mechanism actuated by a timing device advances the rotor in step-by-step movement and initiates the washing and oiling operations after each cell reaches the proper position for these functions. The cells are washed clean of dust and oil by hot water which is recirculated from a hot water tank arranged to catch the water which is washed through the cells. The addition of surplus make-up water to the hot water tank floats off the oil film washed from the plates during the washing operations, through a trap to the sewer, thus keeping the wash water free from oil contamination. The sludge washed down from the precipitating plates is removed by a mechanical conveyor in a form for convenient disposal, and neither the washing and oiling of the plates nor the sludge removal interferes with the continuous precipitating action of the remainder of the cells on the rotor which are not being cleaned at any particular moment. The machine may remain in continuous service without attention for long periods with two of the cells always in washing and oiling position and all the remaining cells in the rotor functioning actively to remove dust and dirt from the air stream.

The invention will be better understood and additional objects and advantages will become apparent as the description proceeds in connection with a preferred embodiment illustrated on the accompanying drawings. It is to be understood, however, that various changes may be made in the construction and arrangement of parts, and that certain features may be used without others, as will be apparent to persons skilled in the art.

General construction

The machine comprises a generally cylindrical casing 10 connected with an axial inlet duct 11 and an upwardly directed radial outlet duct 12. The gas stream to be cleaned may be blown in through the duct 11 under a pressure above atmospheric, but it is preferred to operate the system by means of a conventional suction or exhaust fan, not shown, in the outlet duct 12. By operating the machine under sub-atmospheric pressure, there is no leakage of dust, or of the gas being treated, into the room containing the equipment.

Figure 10:
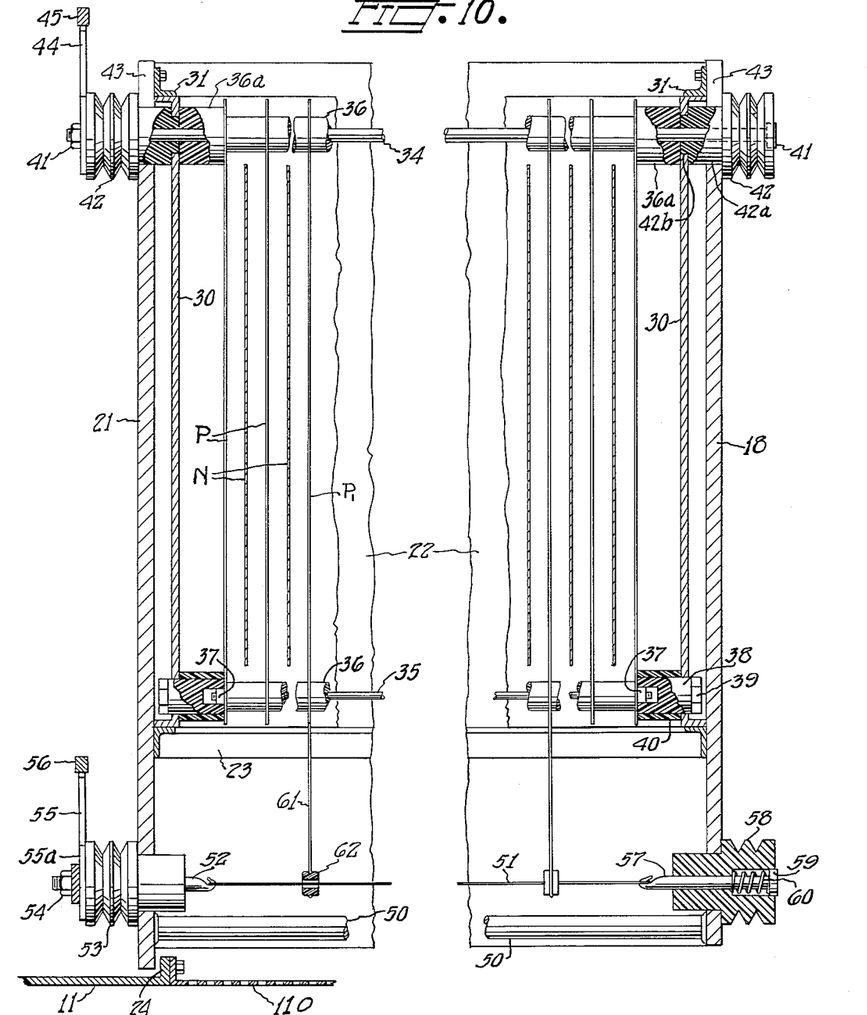
Figure 10 is an enlarged view of one of the precipitating cells in the rotor.

The casing 10 contains a rotor R having an open center and a peripheral framework carrying a plurality of precipitating cells C, illustrated in detail in Figure 10. The cells C contain electrically charged plates of different polarity disposed in spaced radial planes to provide for the passage of gas outwardly between the plates in all directions away from the axis of the rotor, the housing 10 being spaced away from the periphery of the rotor to provide expanding semicircular channels 13 to convey the gas from the rotor to the outlet duct 12 at the top of the casing.

Figure 6:
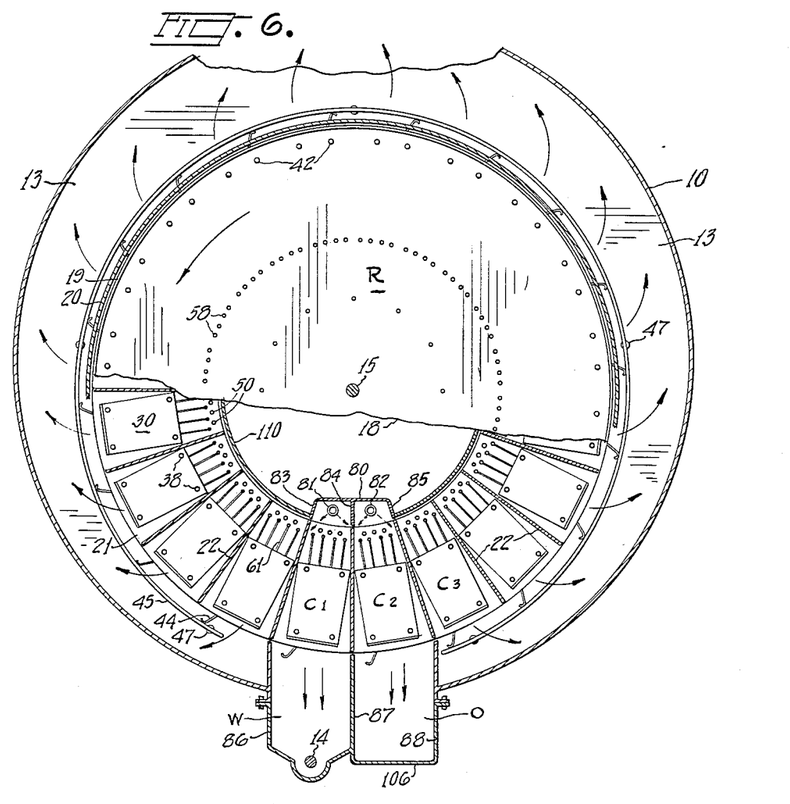
Figure 6 is a cross sectional view taken on the line 6—6 of Figure 3.

Underneath the rotor there is a washing chamber W and an oiling chamber O defining stations for the washing and oiling of the precipitating plates in two of the cells C of the rotor, as shown in Figure 6. When one cell is in the washing chamber the preceding cell is in the oiling chamber, and while in this position the two cells are shielded and shut off from the air flow through the machine, leaving all the remaining cells in communication with the inlet and outlet ducts and active for precipitation purposes. The washing chamber W is equipped with a screw conveyor 14 for removing sludge without interfering with the operation of the machine. A flight, or drag, conveyor may be used, if preferred.

Figure 11:
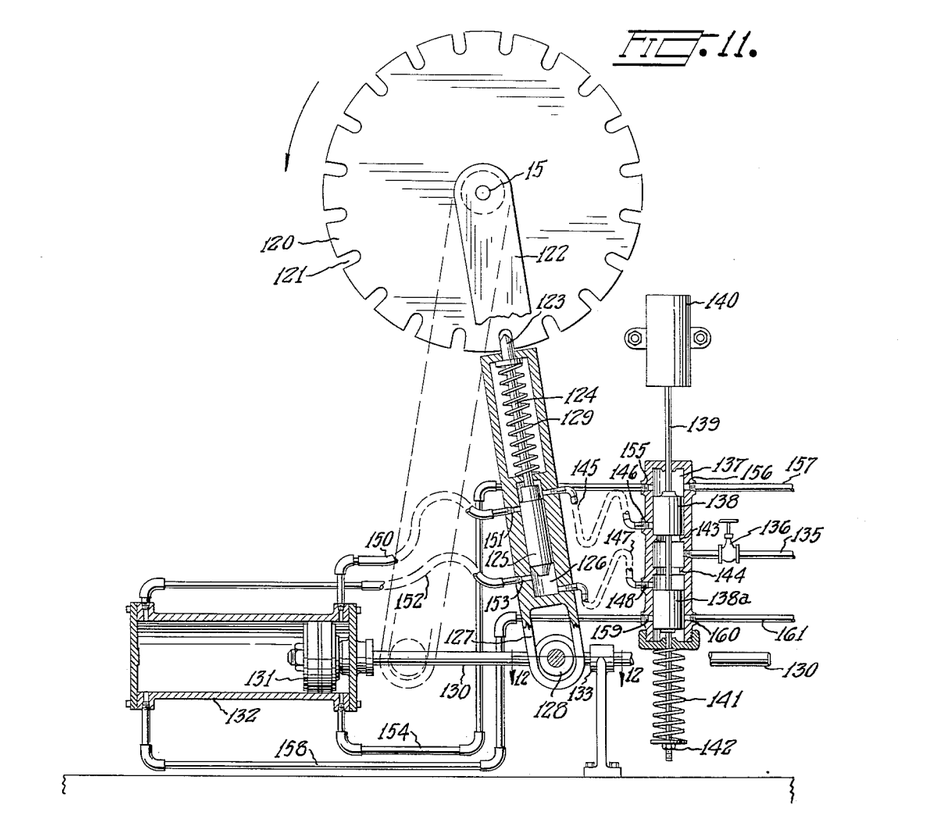
Figure 11 is a view of the rotor turning device.
Figure 12:
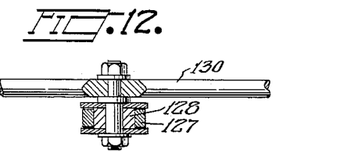
Figure 12 is a sectional view taken on the line 12—12 of Figure 11.

Mounted on one end of the housing 10 is a rotor turning device T which is illustrated in detail in Figure 11. The function of this device is to turn the rotor R in slow step-by-step movement to index the rotor in the proper position at the end of each movement to place two adjacent cells in the washing and oiling positions, respectively, in relation to the chambers W and O. The rotor turning device is not in constant operation, but is actuated periodically under time control by the cycle control mechanism shown in Figure 13, which also turns the washing and oiling sprays on and off and operates the sludge conveyor 14 at the proper times in a continuously repeating cycle.

Rotor assembly

Figures 1, 2:
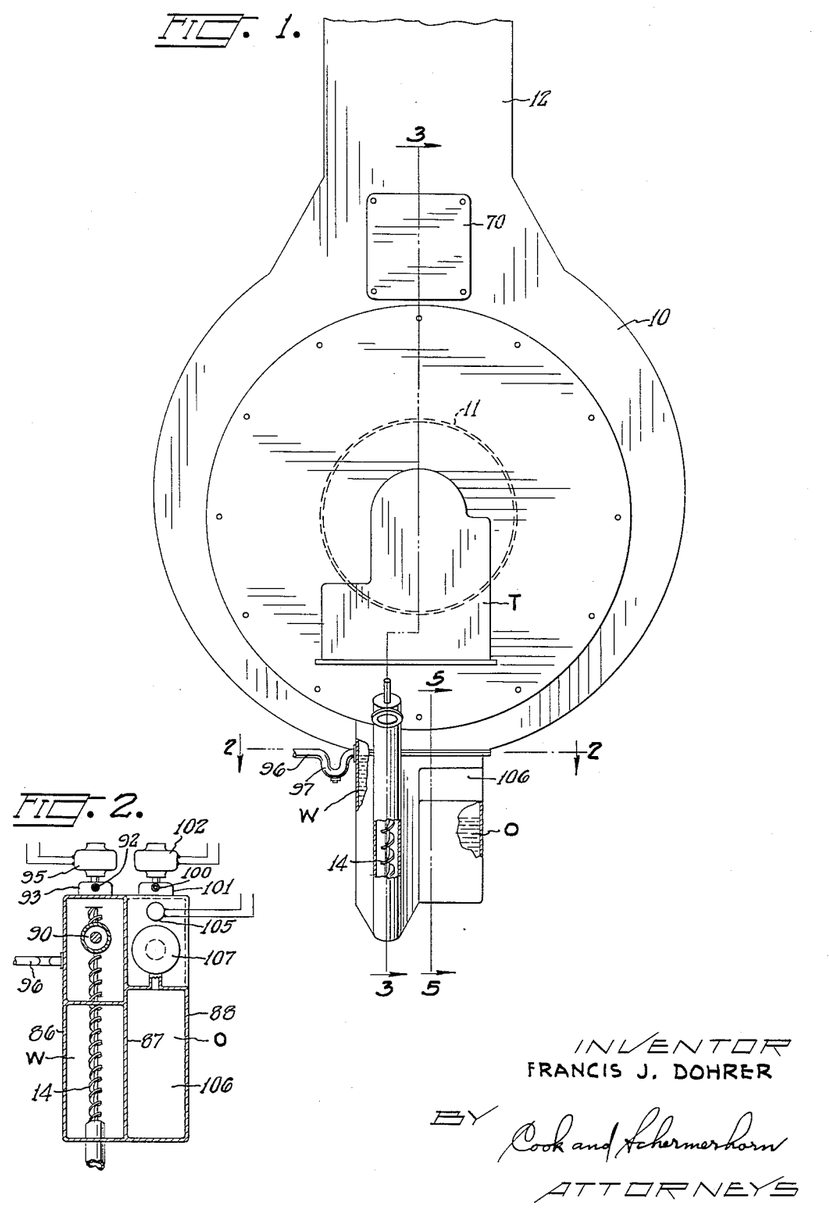
Figure 1 is a rear end elevation view of the machine of the present invention.
Figure 2 is a sectional view taken on the line 2—2 of Figure 1.
Figure 3:
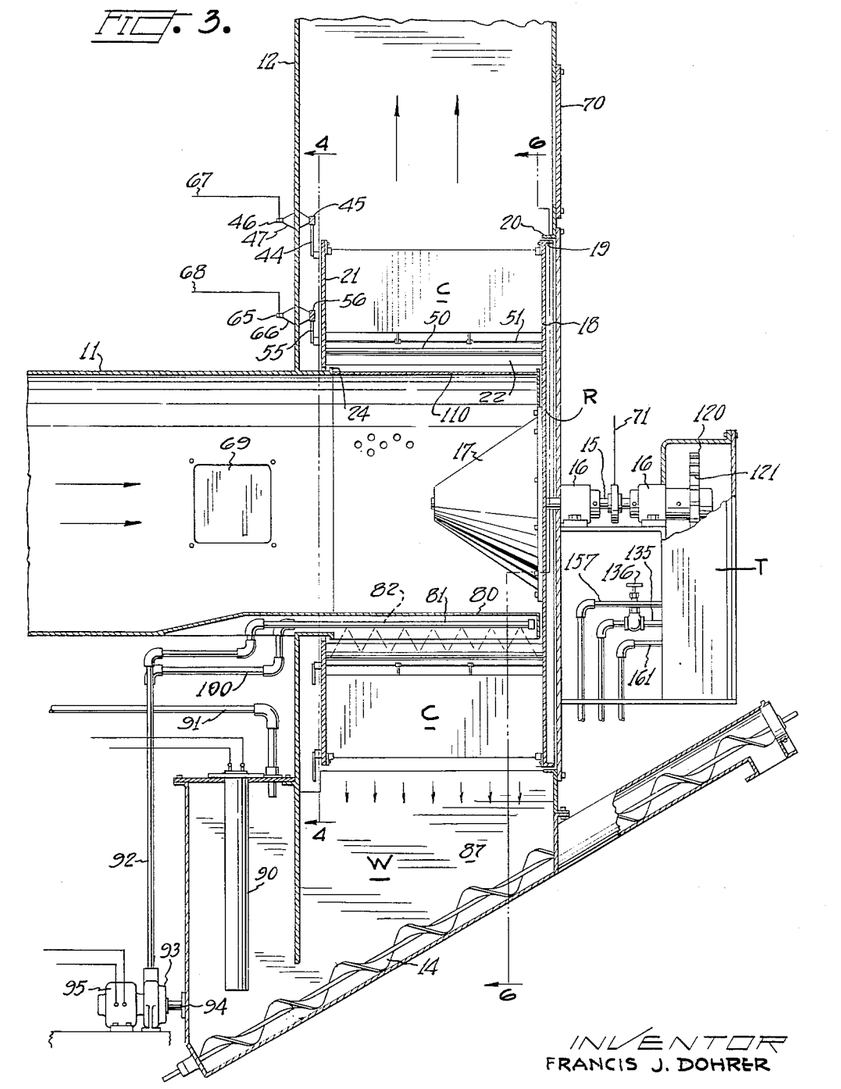
Figure 3 is a longitudinal sectional view taken on the line 3—3 of Figure 1.

The rotor assembly is carried by a shaft 15 mounted for rotation in bearings 16 shown in Figure 3 at the back of the machine. This shaft extends within the casing 10 and carries a forwardly projecting conical support and gas deflector 17. Bolted to the large end of support 17 is a circular back plate 18 having a peripheral flange 19 rotating closely adjacent a circular flange 20 on the rear wall of the casing 10. On the front side of the rotor is an annular face plate 21 supported by radial partition plates 22 (Figure 6) which are connected with the back plate 18. Cell supports 23 (Figure 10) are welded to the plates 18, 21 and 22. Inlet conduit 11 extends through the forward wall of housing 12 and terminates in a flanged end 24 just behind and closely adjacent the face plate 21.

Figure 9:
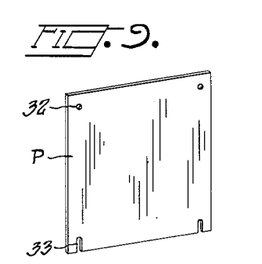
Figure 9 is a perspective view of a positive precipitating plate without ionizing wire supports.

The construction of the precipitating cells C is best shown in Figure 10, reference also being made again to Figures 3 and 6. Each cell is an integral removable unit contained within and supported by a cell casing 30, preferably made of welded stainless steel plate. These cells may be inserted on the upper side of the rotor to rest on the cell supports 23, in which position they are held by retaining bars 31 bolted to the back and face plates 18 and 21 of the rotor. Supports 23 close all the spaces around one end of each cell, preventing gas leakage around the cells. The cells contain closely spaced positive plates P and negative plates N. Positive plates P have holes 32 in their upper ends and slots 33 in their lower ends, as shown in Figure 9, for support by four rods, while negative plates N are welded at their edges to two opposite walls of the cell casing 30.

Holes 32 in the positive plates P receive a pair of rods 34 and the slots 33 receive a pair of rods 35. Insulating spacers 36 maintain equidistant separation of all the plates. Each lower rod 35 is threaded at its ends to receive nuts 37 for clamping the assemblage of positive plates and spacers together. Each nut 37 is integrally imbedded in an insulating body 38 having a hexagonal head portion 39 extending through a circular opening in cell casing 30 to be engaged by a wrench for tightening the nut. Insulating sleeves 40 surround the bodies 38 to space the positive plate assemblage from the walls of cell casing 30.

Rods 34 are threaded at their ends to receive nuts 41 clamping a pair of insulators 42 against enlarged end spacers 36a. Insulators 42 have large necks 42a extending through slots 43 in the back and face plates 18 and 21 of the rotor, and small necks 42b projecting through circular openings in cell casing 30 whereby the rods 34 are insulated from the rotor and cell casing and the positive plate assemblage is spaced from the walls of the cell casing. The cells are assembled before insertion in the rotor, and are readily removable from the rotor for repair or replacement, the slots 43 being radial and having open outer ends to receive the insulators 42. Also engaged under one of the nuts 41 on each cell in a manner to make good electrical connection with the rod 34 is a spring trolley or brush contact finger 44 having wiping contact with an arcuate metallic collector ring 45. The collector ring 45 is mounted on a plurality of bolts or studs 46 supported on and extending through the wall 12 by means of suitable high tension insulators 47 as shown in Figure 3.

Included in the rotor assembly are negative ionizing rods 50 and positive ionizing wires 51 forming an ionizing zone at the gas entrance to the precipitating zone in cells C. The rods 50 are preferably attached at their ends directly to the rotor plates 18 and 21, and are thereby grounded to the framework of the machine. Each wire 51 has one end anchored to a fixed anchor bolt 52 in an insulator 53 extending through the plate 21. A nut 54 on the bolt 52 secures this bolt and maintains electrical and mechanical conection with a flexible brush contact finger or trolley member 55 engaging a second collector ring 56. Groups of the anchor bolts 52 are preferably connected together by short bus bars 55a each having one contact finger 55. The wires 51 are maintained taut by a second anchor bolt 57 passing loosely through a bore in an insulator 58 which extends through the back plate 18. This insulator has an enlarged counterbore to receive a head or nut 59 on the bolt 57 and a compression spring 60 for urging the bolt outwardly to tension the wire.

Figure 8:
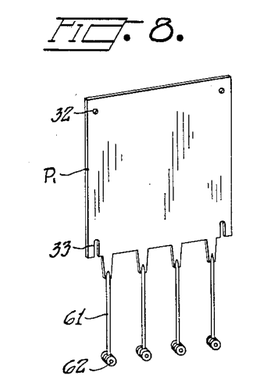
Figure 8 is a perspective view of a positive precipitating plate equipped with supports for ionizing wires.

When the rotor is sufficiently long in an axial direction to require additional means to prevent sagging of the wires 51, intermediate wire supports $P_1$ are provided on certain of the positive plates $P_1$ as illustrated in Figure 8. Since the ionizing wires 51 are ordinarily maintained at a different electrical potential than the positive plates $P_1$, the supports 61 are equipped with insulators 62 to engage the wires 51 and prevent electrical connection with the positive plates. The wires 51 are strung after the cell is inserted in the rotor and must be removed before a cell can be taken out of the rotor.

The collector ring 56 is supported by a plurality of bolts or studs 65 mounted in insulators 66 extending through the housing wall 12. An external electrical connection 67 may be made with one of the bolts 46 in Figure 3 to the positive side of the precipitating voltage supply, not shown. Similarly, an external connection 68 may be made with one of the bolts 65 to supply the positive ionizing potential from a source, not shown. The precipitating potential connection with wire 67 may be around 6000 volts, whereas a higher potential, as, for example, 10,000 volts, is usually preferred for the ionizing voltage connection with wire 68. The precipitating and ionizing circuits have a common negative connection 71 in electrical contact with shaft of rotor R.

Figure 4:
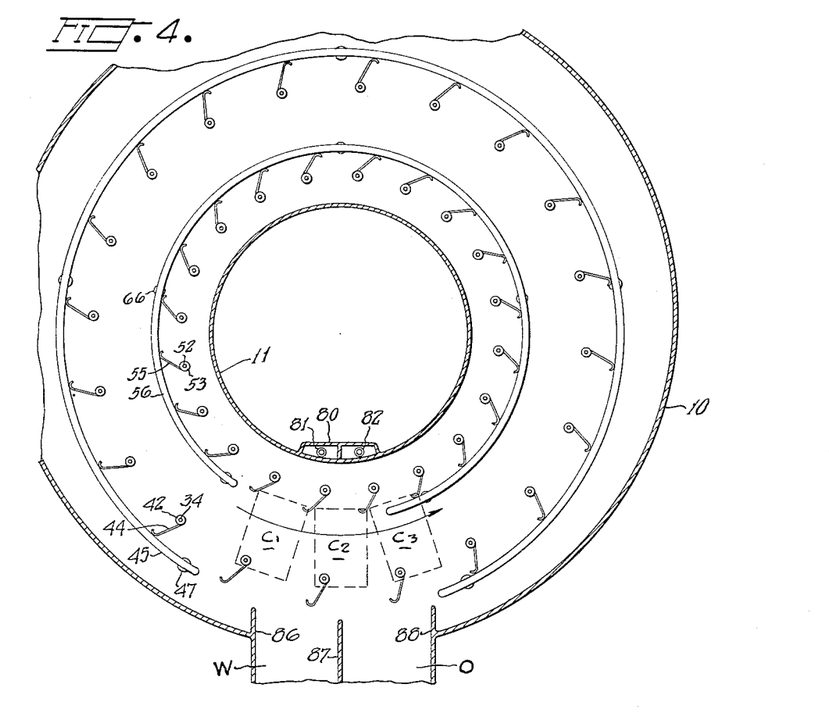
Figure 4 is a cross sectional view taken on the line 4—4 of Figure 3.

The collector rings 45 and 56 are interrupted at the bottom side of the rotor to deenergize the positive plates P and $P_1$ and ionizing wires 51 of the two cells being washed and oiled. Figure 4 shows the rotor in motion with the contact fingers 44 and 55 of a cell $C_1$ about to disengage the collector rings and the contact fingers of cell $C_3$ just reengaged with the collector rings. At this instant only the cell $C_2$ is deenergized, but when the rotor stops in its next rest position both cells $C_1$ and $C_2$ will be deenergized for washing and oiling as in Figure 6.

Manholes 69 and 70, equipped with suitable gasketed cover plates or doors, provide access to the internal structure, for installation and removal of cells, ionizing wires, and other purposes. These doors are equipped with the usual safety switches, not shown, to insure deenergization of the high voltage circuits when the doors are opened.

*Plate cleaning mechanism*

Extending within the rotor is a false floor 80 having a removable top for access to a water spray pipe 81 and an oil spray pipe 82. Extending downwardly beneath this floor are partition walls 83, 84 and 85 spaced to register with the partition plates 22 of the rotor when the rotor is in one of its rest positions. The washing and oiling chambers W and O have similar upstanding walls 86, 87 and 88, closely approaching and registering with the partition plates 22. These walls and the floor 80 substantially seal and isolate the two cells being cleaned from the incoming and outgoing gas stream which passes through all the remaining cells. Semicircular chambers 13 terminate at the walls 86 and 88. This structure is shown in Figure 6.

The wash water is maintained at a predetermined constant temperature by a thermostatically controlled electric heater 90, shown in Figure 3. The supply of water is replenished through pipe 91. Water spray pipe 81 is supplied by a pipe 92 from a pump 93 having an inlet at 94 in an auxiliary tank communicating with the chamber W. Pump 93 is driven by motor 95 at certain intervals determined by a cycle control mechanism which will be presently described. The used wash water is returned to the tank for reuse after the sludge has settled out, thereby saving hot water and reducing the cost of heating. Excess water may be supplied through pipe 91 from time to time, or continuously, if desired, allowing the overflow from the chamber W to pass off through a surface drainpipe 96. This drainpipe is equipped with a trap 97 to maintain a liquid seal to atmosphere. Oil washed from the cells in the washing operation settles on top of the water in the wash water tank, and the addition of fresh water in excess of the capacity of the tank floats the oil out through trap 97 to keep the wash water supply free of oil.

Figure 5:
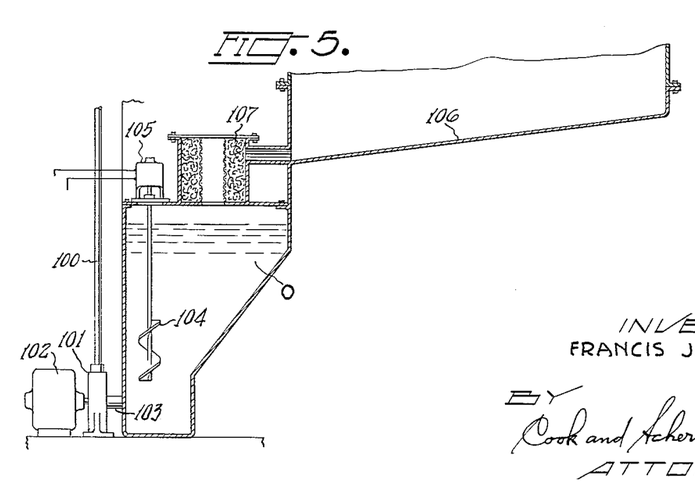
Figure 5 is a fragmentary longitudinal sectional view taken on the line 5—5 of Figure 1.

The oil spray pipe 82 is supplied by a pipe 100 connected with a pump 101 driven by a motor 102, also under the control of the cycle control mechanism. Pump 101 has an inlet 103 connected with the tank of oil chamber O as shown in Figure 5. This tank is equipped with a stirring device 104 driven by a motor 105 which operates constantly while the machine is in use. The oil sprayed through and drained from the precipitating plates is collected by a drain pan 106 from whence it flows by gravity through filter 107 to the lower part of the tank, designated generally by the character O. The oil tank is heated by the adjacent hot water tank. The term "oil" is understood by persons skilled in the art to mean an oil base adhesive which is soluble in hot water.

Figure 7:
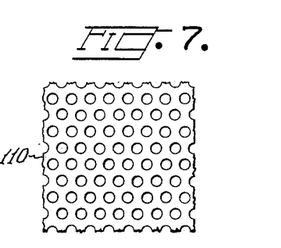
Figure 7 is a fragmentary view showing a portion of the air distributing screen within the rotor.

The floor 80 supports a generally cylindrical stationary screen 110 extending into the open interior of the rotor so that all the dust-laden air must pass through it before entering the ionizing and precipitating zone in the rotor. This screen, which preferably comprises a perforated plate as shown in Figure 7, equalizes the air flow to all the active precipitator cells so that the air stream will not tend to follow a direct course by way of the shortest path to the outlet conduit. This screen is, of course, interrupted between the walls 83 and 85 which serve to partition off the washing and oiling stations at the bottom of the rotor.

*Rotor turning device*

Keyed to the outer end of rotor shaft 15 is a disc 120 having a number of peripheral notches 121 equal to the number of precipitating cells in the rotor. Pivotally mounted on the shaft 15 is a swinging arm 122 having a retractable dog 123 to engage in the notches 121. Dog 123 is mounted on the end of a piston rod 124 connected with a piston 125 in a cylinder 126 in the arm 122. The dog is biased upwardly into engagement with disc 120 by a light spring 129. The lower end of arm 122 is equipped with a crosshead guide 127 to receive a crosshead 128 on a horizontal piston rod 130.

Piston rod 130 is connected with a piston 131 in a stationary cylinder 132, whereby reciprocation of the piston 131 is operable to swing the arm 122 through sufficient arc to advance the rotor one step when the dog 123 is engaged with the disc 120. The outer end of piston rod 130 is supported in an external bearing 133.

Water, or other available fluid medium under pressure for actuating the piston 131, is supplied through a pipe 135 equipped with a throttling valve 136 to control the speed of movement. Fluid from the supply pipe 135 is admitted first into the cylinder 137 of a balanced control valve having a pair of spaced piston elements 138 and 138a mounted on a piston rod 139. The upper end of valve piston rod 139 is connected with a magnetic armature which may be lifted by the energization of solenoid 140. Valve rod 139 is normally biased downwardly to its lowermost position by a spring 141 acting against a nut 142 on the lower end of the rod. Annular valve seats 143 and 144 serve to limit the movement of the piston elements and prevent leakage through the control valve.

A flexible hose 145 connects the upper end of cylinder 126 with a port 146 above the valve seat 143, but at a distance from the upper end of cylinder 137 greater than the length of piston element 138. A flexible hose 147 connects the lower end of cylinder 126 with a port 148 beneath the valve seat 144 but at a distance above the lower end of cylinder 137 greater than the length of piston element 138a. A flexible hose 150 connects a port 151 spaced from the upper end of cylinder 126 with the right end of cylinder 132, and a flexible hose 152 connects a port 153 spaced from the lower end of cylinder 126 with the left end of cylinder 132. A pipe 154 connects the right end of cylinder 132 with a port 155 spaced a short distance from the upper end of cylinder 137, and another port 156 similarly positioned in the cylinder 137 is fitted with a discharge pipe 157. A pipe 158 connects the left end of cylinder 132 with a port 159 spaced a short distance from the lower end of cylinder 137, and a second port 160 similarly positioned in the cylinder 137 is connected with a discharge pipe 161.

Cycle control mechanism

Figure 13:
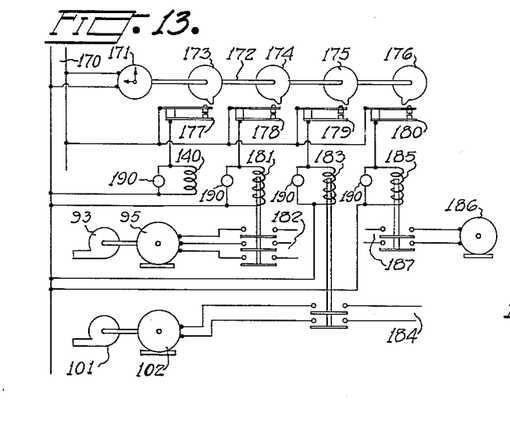
Figure 13 is a schematic diagram of the cycle control mechanism for the machine.

Figure 13 illustrates the electrical time control system for performing the various operations thus far described at the proper times to turn the rotor in step by step movement and wash and oil each cell of the precipitator in turn.

The numeral 170 designates a supply circuit for the control equipment. Illustrated diagrammatically is a time clock 171 having a cam shaft 172 which makes one revolution in some period of time such as one hour. The cam shaft 172 is represented as equipped with four cams 173, 174, 175 and 176, set in different positions on the shaft. A plurality of normally open switches 177, 178, 179 and 180 are mounted adjacent the respective cams to be closed thereby for brief periods at certain times in each revolution of the cam shaft. It is to be understood that these switches are shown as having metallic contact arms merely for convenience of illustration, and that ordinarily such equipment would comprise a gang of mercury switches, each arranged to be tilted to closed position by a closing cam and later tilted back to an open position by an opening cam, whereby both the opening and the closing movements may be closely controlled to accomplish precise timing of a plurality of different operations for different durations of time within the cycle.

Solenoid 140, illustrated also in Figure 11, is connected in series with switch 177 to be energized when this switch is closed. A relay solenoid 181 is similarly connected in series with switch 178 to close the circuit between water pump motor 93 and a power supply source 182. A relay solenoid 183 is connected in series with switch 179 to close the circuit to oil pump motor 101 from a source of power supply 184. Relay solenoid 185 is connected in series with switch 160 to energize a driving motor 186 for the screw conveyor 14 from a source of power 187. Signal lights 190 shunted across these various solenoids indicate when the respective circuits are energized.

It is to be understood, of course, that cam shaft 172 may be geared down from the one hour shaft of time clock 171 to make one revolution in either a longer or a shorter interval of time, as may be required for a particular installation.

Operation

The cams associated with the timing device 171 in Figure 13 are adjusted to produce the following schedule of operations in a one hour cycle:

SCHEDULE OF OPERATIONS IN ONE HOUR CYCLE

| Time Settings of Switch Cams | | | Time per Hour | |
| --- | --- | --- | --- | --- |
| Switch | On | Off | On | Off |
| Rotor Control Switch 177 | 0′— 0″ | 1′— 0″ | 1′— 0″ | 59′— 0″ |
| Water Pump Switch 178 | 1′—20″ | 5′—35″ | 4′—15″ | 55′—45″ |
| Oil Pump Switch 179 | 6′— 0″ | 8′— 0″ | 2′— 0″ | 58′— 0″ |
| Conveyor Motor Switch 180 | 55′— 0″ | 59′—55″ | 4′—55″ | 55′— 5″ |
| | | | 12′—10″ | 47′—50″ |

Figure 11 shows the normal rest position of the rotor turning mechanism wherein one precipitating cell is indexed in register with the washing chamber W and an adjacent precipitating cell is indexed in register with the oiling chamber O as shown in Figure 6. At the beginning of each hour, the timing mechanism 171 closes switch 177 for one minute and then reopens it, the switches 178, 179 and 180 remaining open. A few seconds is adequate but the minimum opening and closing time differential of such a switch is usually nearly one minute. In practice, this switch may remain closed for the shortest time interval of which the cam setting is capable.

The closing of switch 177 energizes solenoid 140, lifting valve rod 139 against the compression of spring 141. The lifting of valve piston elements 138 and 138a admits fluid pressure from supply pipe 135 into the tube 145 leading from the upper end of cylinder 126, driving the piston 125 down and disengaging dog 123 from the disc 120. As soon as piston 125 clears the port 151, fluid under pressure is admitted also through tube 150 to the right end of cylinder 132 to drive piston 131 to the left. This movement swings arm 122 to its broken line position without turning the rotor, placing the retracted dog 123 in position to engage the next notch 121 of disc 120. During the leftward movement of piston 131, port 155 is closed by valve piston 138 and port 153 is closed by piston 125. The fluid in the left end of cylinder 132 is discharged through pipe 158 and ports 159, 160, to discharge pipe 161.

When switch 177 is reopened to deenergize solenoid 140, spring 141 returns control valve rod 139 to its lower position, uncovering the ports 155, 156 and 148 and covering the ports 159, 160 and 146. Fluid under pressure is thereby admitted from pipe 135 through hose 147 to the lower end of cylinder 126. This lifts piston 125, uncovering port 153 and covering port 151, and engaging dog 123 with the next notch in disc 120. Fluid under pressure is also transmitted through tube 152 to the left end of cylinder 132 to drive piston 131 back to the right. During the rightward movement of piston 131, fluid is discharged from the right end of cylinder 132 through pipe 154 and ports 155, 156, to discharge pipe 157. The movement of piston 131 to the right returns arm 122 to its full line position, rotating disc 120 one step in a counterclockwise direction and holding the rotor again in an indexed position, as shown in Figure 6. This movement carries the cell which was in the oiling chamber out into the active air circuit for dust precipitation, the contact fingers 44 and 55 reestablishing contact with their respective collector rings to energize the ionizing wires 51 and positive precipitating plates P of that cell. The cell in the washing chamber moves over to the oiling chamber, and a new dust laden cell moves into the washing chamber, breaking contact with collector rings 45 and 56.

At 1 minute 20 seconds, switch 178 is closed for 4 minutes and 15 seconds, during which time water pump motor 95 is energized by relay 181 to operate the hot water spray 81 for washing the precipitating plates of the new dust laden cell in the washing chamber. The water spray is shut off at 4'—35", allowing the remainder of the cycle period for draining and drying.

At 6 minutes 0 second, the switch 179 is closed for a period of 2 minutes, closing switch 179 to energize relay 183 to start oil pump motor 102. During this period the oil spray pipe 82 flushes the plates with a suitable adhesive oil to retain the dust which is attracted thereto by electrostatic precipitation. The oil spray stops at 8 minutes 0 second, allowing the remainder of the hour for draining of excess oil from the plates.

At 55 minutes 0 second, switch 180 is closed for 4 minutes and 55 seconds to operate conveyor motor 186 for removing any sludge and sediment from the bottom of the wash tank, over 49 minutes having been allowed for such settling to take place in a quiescent condition after turning off of the water sprays. When switch 180 is reopened at 59 minutes 55 seconds, the control system is returned to its initial starting condition shown in Figure 13 in readiness for a new cycle, with switches 177, 178, 179 and 180 all open.

Thus, by turning the rotor in step-by-step movement while the machine is in active service, all but two of the precipitating cells are active at all times for the purpose of removing dust from the gas stream, and no more than two cells are inactive at any time for the purpose of cleaning. Hence, a machine of relatively small size has the equivalent effective capacity of a vastly larger machine which is cleaned less frequently. Machines of the type having stationary plates are ordinarily required to run from one to two weeks without cleaning of the plates, whereas in the present machine the plates may be cleaned as often as twice an hour, if necessary. The present machine has twenty precipitating cells and is scheduled to clean one cell per hour, but it appears from the timing schedule that the actual operations, exclusive of draining the oil from the plates, requires only twelve minutes and ten seconds out of each hour, thereby allowing ample reserve to speed up the machine for handling much higher dust concentrations. Cleaning of the plates is accomplished rather easily when it is done once a day or oftener, but, after longer intervals, the removal of the dirt saturated viscous adhesive is considerably more difficult. Frequent cleaning of the plates also reduces the chance of blow-off of the precipitated dust. The movement of the rotor is accomplished slowly without vibration which would tend to jar the precipitated dust from the plates prematurely. All the moving parts requiring service or attention, such as the rotor shaft, mechanical movers, etc., are outside of the dust collecting section, where they are free of contamination and easily accessible.

The frequent cleaning of the plates, and continuous filtration of the oil, allows the rather expensive oil ordinarily preferred for this purpose to be used for long periods without change. No oil is wasted until it has outlived its usefulness.

The capacity of the present type of precipitator may be increased as desired by using a larger diameter rotor to accommodate more cells of the same size and also by increasing the axial length of the rotor to make the cells longer.

Having now described my invention and in what manner the same may be used, what I claim as new and desire to protect by Letters Patent is:

1. In an electric precipitator, a rotor having a plurality of precipitating cells distributed circumferentially around the rotor, a back plate on said rotor supporting said precipitating cells at a distance from the axis of the rotor, a conical deflecting shield having its base mounted on one side of said back plate and its apex extending into the eye of the rotor, a shaft supporting the rotor mounted in said back plate and conical shield, and bearings supporting said shaft and rotor on the other side of said back plate.

2. An electric precipitator comprising a rotor mounted on a horizontal axis, a plurality of precipitating cells distributed circumferentially around the rotor at a distance from the axis of the rotor to leave an axial flow gas inlet opening in the center of the rotor, each of said cells having spaced flat radial precipitating plates defining radial gas passages through the rotor, means for mounting said cells in said rotor for individual removal, cleaning stations at the bottom side of said rotor adapted to treat one cell at a time, a gas inlet duct communicating through said open center of the rotor with all of the rotor cells except the cells at said cleaning stations, and an outlet duct communicating at the periphery of said rotor with all of the rotor cells except the cells at said cleaning stations.

3. An electric precipitator comprising a rotor mounted on a horizontal axis, an annular arrangement of flat radial precipitating plates in said rotor spaced from the axis of the rotor and defining radial gas passages through the rotor, a gas inlet duct communicating with said radial passages through the center of the rotor, a gas outlet duct communicating with said radial passages at the periphery of the rotor, cleaning stations at the bottom of the rotor shielded from said ducts, and downwardly directed radial flow nozzles for said cleaning stations extending through the center of the rotor.

4. An electric precipitator comprising a rotor having an annular arrangement of precipitating plates defining radial gas passages, a back plate on said rotor having a conical shield or one side thereof projecting into the eye of the rotor, a rotor shaft mounted in said back plate and shield, an axial gas inlet duct communicating with the eye of the rotor, a gas outlet duct communicating with the periphery of said rotor, bearings for said shaft on the other side of said back plate and outside of said ducts, and a rotor plate washing chamber communicating with a portion of said rotor and isolated from said inlet and outlet ducts.

5. An electric precipitator comprising a rotor on a horizontal axis having an annular arrangement of radial precipitating plates defining radial gas passages through the rotor and spaced from the axis of the rotor to leave an opening in the center of said rotor, an inlet duct communicating with the center of said rotor, an outlet duct communicating with the periphery of said rotor, downwardly directed washing and oiling means for said plates mounted in said center opening of the rotor, and means to turn said rotor to move groups of said plates into operative relation to said washing and oiling means.

6. An electric precipitator comprising a rotor on a horizontal axis having a plurality of radial partitions spaced around the periphery of the rotor, radial plate precipitating cells removably mounted between said partitions and in annular arrangement at a distance from the axis of the rotor to leave an open center in said rotor and define radial gas passages through said rotor communicating with said open center, an inlet duct communicating with said open center, an outlet duct communicating with the periphery of said rotor, downwardly directed liquid spray means in the center of the rotor, and a liquid receptacle beneath said spray means at the periphery of said rotor having walls spaced to register with said partitions in the rotor.

7. In an electric precipitator, a rotor frame, a plurality of precipitating cells each having a series of spaced flat plates assembled as a unit, said cells being distributed circumferentially around the rotor frame with all of said plates disposed in radial planes defining radial gas passages through the rotor, supports positioning the inner ends of said cells at a distance from the axis of the rotor to provide an axial flow gas inlet opening in the center of the rotor, and retaining means disposed around the periphery of the rotor engaging the outer ends of said cells to hold the cells seated on said supports, said cells being removable from the rotor when said retaining means are removed.

8. In an electric precipitator, a rotor frame, a plurality of precipitating cells, each assembled as a unit, distributed circumferentially around the rotor and defining radial gas passages through the rotor, abutment means in said rotor frame seating the radially inner ends of said cells in substantially edge to edge relation at a distance from the axis of the rotor, and removable abutment means engaging the radially outer ends of said cells to retain the cells in the rotor.

9. In an electric precipitator, a rotor frame comprising a pair of circular end plates, one of said end plates closing one end of the rotor and connected with a shaft supporting the rotor, the other end plate having an annular shape to provide an axial gas inlet opening, a plurality of radial gas flow precipitating cells, each assembled as a unit, disposed around the periphery of the rotor in communication with said axial inlet opening, and means securing said cells in the rotor for individual removal.

10. In an electric precipitator, a rotor frame, a plurality of precipitating cells, each assembled as a unit, distributed circumferentially around the rotor and defining radial gas passages through the rotor, abutment means seating the inner ends of said cells in substantially contiguous relation at a distance from the axis of the rotor, means securing said cells in the rotor in said relation for individual removal, a contact finger insulatedly carried by each of said cells and removable with a cell, and a conductor ring adjacent the rotor engaging said fingers to energize said cells.

11. In an electric precipitator, a rotor having a plurality of radial plate precipitating cells distributed circumferentially around the rotor, means mounting said cells in the rotor for individual removal, one end of said rotor being closed and connected with a shaft supporting the rotor, the other end of said rotor having an axial gas inlet opening communicating with the inner ends of said cells, ionizing electrodes adjacent the inner ends of the cells defining an ionizing zone surrounding said inlet opening, and a housing substantially surrounding the periphery of the rotor and forming an outlet passage for treated gas.

12. An electric precipitator comprising a rotor on a horizontal axis, a plurality of radial plate precipitating cells distributed circumferentially around said rotor, axial inlet and peripheral discharge ducts for passing gas to be cleaned simultaneously through substantially all of said cells in radial directions, washing and oiling stations for treating a limited number of cells at the lowermost point of said rotor, a hot water spray extending into the center of the rotor for washing said cells at said washing station, a tank beneath said rotor for collecting wash water from said cells, conveyor means for removing sediment from the bottom of said tank, an oil spray for oiling said cells at said oiling station, and a tank beneath said rotor to receive oil drained from said plates at said oiling station.

13. An electric precipitator comprising a rotor on a horizontal axis having precipitating cells with radial plates distributed circumferentially around said rotor, washing and oiling stations embracing the two lowermost cells of said rotor, axial inlet and peripheral outlet ducts for gas to be cleaned communicating with the remaining cells of said rotor, a hot water spray pipe mounted in the center of the rotor to direct water sprays downwardly through a cell at said washing station, a tank to receive the water drained from a cell at said washing station, a pump for supplying said spray with water from said tank, means to add fresh make-up water to said tank, an overflow pipe for removing a floating oil film from the water in said tank, an oil spray mounted to direct oil into a cell at said oiling station, a tank for receiving oil drained from said cell at said oiling station, means to filter the drained oil for re-use, and a pump for supplying said oil spray from said oil tank.

14. An electric precipitator comprising a rotor having a plurality of precipitating cells distributed circumferentially around the rotor, a disc connected with said rotor and having a number of peripheral notches equal to the number of cells in said rotor, an oscillating arm having a dog to engage said notches, reciprocating fluid pressure operated means oscillating said arm and moving said dog through an arc equal to the distance between said notches to turn said rotor in step-by-step movement and hold said rotor in indexed position at the end of each movement, and a throttling valve controlling the speed of said fluid pressure operated means to prevent jarring of said rotor in said step-by-step movements.

15. An electric precipitator comprising a rotor having a plurality of precipitating cells distributed circumferentially around said rotor, a washing station at one side of said rotor to accommodate one of said cells at a time, a disc connected with said rotor and having a number of peripheral notches equal to the number of said cells, reciprocating fluid pressure operated means engageable with said notches turning said rotor in step-by-step movement to move and hold one cell after another in register with said washing station, and a throttling valve controlling the speed of said fluid pressure operated means to prevent jarring of said rotor in said step-by-step movements.

16. In an electric precipitator, a rotor having a plurality of precipitating cells distributed circumferentially around said rotor, a washing station to receive one of said cells at a time, a pump operated wash spray to wash said cells at said washing station, an oiling station to receive one of said cells at a time, a pump operated oil spray to oil said cells at said oiling station, means for turning said rotor in step-by-step movement to advance one cell at a time through said washing and oiling stations and hold said rotor in indexed positions, and time controlled means for starting the operation of said rotor turning means and for operating said water pump and said oil pump at predetermined intervals in a repeating cycle.

17. In an electric precipitator adapted for continuous operation, a rotor having a plurality of precipitating cells circumferentially distributed around said rotor, a washing station having a wash spray to treat one of said cells at a time, an oiling station having an oil spray to treat one of said cells at a time, reciprocating means for turning said rotor in intermittent movement to move one cell after another through said stations and hold said rotor in indexed positions, means to direct a stream of gas to be cleaned through the remaining cells which are not disposed at said washing and oiling stations, and time controlled means for starting said rotor turning means and operating said water spray and said oil spray at predetermined intervals in a continuously repeating cycle.

18. In an electric precipitator, a rotor having a plurality of precipitating cells distributed circumferentially around said rotor, a washing station adapted to treat one cell at a time at the bottom of said rotor, a water spray in said washing station, an oiling station adjacent said washing station adapted to treat one cell at a time, an oil spray in said oiling station, means to direct a stream of gas to be cleaned into the center of said rotor and radially outwardly through all of the cells of said rotor except the two cells disposed in said washing and oiling stations, means to turn said rotor in step-by-step movement to advance said rotor cell-by-cell through said stations, and means to time the operation of said rotor turning means, water spray and oil spray in a continuously repeating cycle.

References Cited in the file of this patent

UNITED STATES PATENTS

| | | |
|---|---|---|
| 1,412,248 | Laughlin | Apr. 11, 1922 |
| 1,444,092 | Anderson | Feb. 6, 1923 |
| 1,456,044 | Strong | May 22, 1923 |
| 2,119,297 | Scott | May 31, 1938 |
| 2,333,551 | Pegg | Nov. 2, 1943 |
| 2,409,563 | Hedberg | Oct. 15, 1946 |
| 2,486,520 | Dahlman | Nov. 1, 1949 |
| 2,582,133 | Karlsson | Jan. 8, 1952 |
| 2,609,061 | Hahn | Sept. 2, 1952 |

FOREIGN PATENTS

| | | |
|---|---|---|
| 290,030 | Great Britain | May 10, 1928 |